(12) United States Patent
Taubman et al.

(10) Patent No.: US 8,831,957 B2
(45) Date of Patent: Sep. 9, 2014

(54) SPEECH RECOGNITION MODELS BASED ON LOCATION INDICIA

(71) Applicant: Google Inc., Mountain View, CA (US)

(72) Inventors: Gabriel Taubman, Brooklyn, NY (US); Brian Strope, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/651,566

(22) Filed: Oct. 15, 2012

(65) Prior Publication Data

US 2014/0039888 A1 Feb. 6, 2014

Related U.S. Application Data

(60) Provisional application No. 61/678,277, filed on Aug. 1, 2012.

(51) Int. Cl.
*G10L 21/00* (2013.01)
(52) U.S. Cl.
USPC ........... 704/275; 704/270; 704/257; 704/243; 704/235; 379/88.04; 379/88.02; 379/88.01
(58) Field of Classification Search
CPC ... G10L 21/0208; G10L 15/20; G10L 15/065; G10L 15/06; G10L 15/183; G10L 15/22; G10L 15/19; G06Q 10/087; G06Q 10/06; G06Q 30/0261
USPC ......... 704/275, 257, 246, 243, 247, 226, 270, 704/270.1, 235; 379/88.04, 88.02, 88.01
See application file for complete search history.

(56) References Cited

U.S. PATENT DOCUMENTS 5,524,169 A * 6/1996 Cohen et al. ................... 704/231
5,657,425 A * 8/1997 Johnson ......................... 704/275

(Continued)

FOREIGN PATENT DOCUMENTS

EP 1691344 A1 8/2006

OTHER PUBLICATIONS

Bocchieri et al. "Use of Geographical Meta-Data in ASR Language and Acoustic Models" 2010.*

(Continued)

*Primary Examiner* — Vijay B Chawan
(74) *Attorney, Agent, or Firm* — Fish & Richardson P.C.

(57) ABSTRACT

Methods, systems, and apparatus, including computer programs encoded on a computer storage medium, for performing speech recognition using models that are based on where, within a building, a speaker makes an utterance are disclosed. The methods, systems, and apparatus include actions of receiving data corresponding to an utterance, and obtaining location indicia for an area within a building where the utterance was spoken. Further actions include selecting one or more models for speech recognition based on the location indicia, wherein each of the selected one or more models is associated with a weight based on the location indicia. Additionally, the actions include generating a composite model using the selected one or more models and the respective weights of the selected one or more models. And the actions also include generating a transcription of the utterance using the composite model.

28 Claims, 6 Drawing Sheets

(56) References Cited

U.S. PATENT DOCUMENTS

| | | | |
|---|---|---|---|
| 6,188,976 | B1 | 2/2001 | Ramaswamy et al. |
| 6,711,543 | B2* | 3/2004 | Cameron .................. 704/270 |
| 7,224,981 | B2 | 5/2007 | Deisher et al. |
| 7,243,069 | B2 | 7/2007 | Jaepel et al. |
| 7,275,029 | B1* | 9/2007 | Gao et al. ..................... 704/9 |
| 7,321,853 | B2* | 1/2008 | Asano ...................... 704/238 |
| 7,533,020 | B2* | 5/2009 | Arnold et al. .............. 704/257 |
| 8,185,392 | B1 | 5/2012 | Strope et al. |
| 8,219,407 | B1* | 7/2012 | Roy et al. .................. 704/275 |
| 8,340,975 | B1* | 12/2012 | Rosenberger ............. 704/275 |
| 8,468,012 | B2* | 6/2013 | Lloyd et al. .................. 704/8 |
| 2001/0041982 | A1* | 11/2001 | Kawasaki et al. ......... 704/275 |
| 2003/0125955 | A1* | 7/2003 | Arnold et al. ........... 704/270.1 |
| 2005/0071159 | A1* | 3/2005 | Boman et al. ............. 704/233 |
| 2005/0080632 | A1* | 4/2005 | Endo et al. ................ 704/277 |
| 2005/0234723 | A1* | 10/2005 | Arnold et al. ............. 704/257 |
| 2006/0293892 | A1* | 12/2006 | Pathuel .................... 704/246 |
| 2008/0046251 | A1* | 2/2008 | Agapi et al. .............. 704/275 |
| 2008/0048830 | A1* | 2/2008 | Glynn et al. .............. 340/5.91 |
| 2008/0091412 | A1* | 4/2008 | Strope et al. ................ 704/10 |
| 2008/0091435 | A1* | 4/2008 | Strope et al. .............. 704/277 |
| 2008/0091443 | A1* | 4/2008 | Strope et al. ................. 705/1 |
| 2008/0154600 | A1* | 6/2008 | Tian et al. ................. 704/251 |
| 2008/0208592 | A1* | 8/2008 | Cross et al. ............... 704/275 |
| 2008/0300886 | A1* | 12/2008 | Patch ........................ 704/275 |
| 2009/0070102 | A1* | 3/2009 | Maegawa ..................... 704/9 |
| 2009/0265163 | A1* | 10/2009 | Li et al. ...................... 704/10 |
| 2010/0023320 | A1* | 1/2010 | Di Cristo et al. ............. 704/9 |
| 2010/0076765 | A1* | 3/2010 | Zweig et al. .............. 704/255 |
| 2010/0312469 | A1* | 12/2010 | Chen ......................... 701/207 |
| 2010/0332235 | A1* | 12/2010 | David ....................... 704/275 |
| 2011/0047139 | A1* | 2/2011 | Strope et al. .............. 707/706 |
| 2011/0066423 | A1* | 3/2011 | Erhart et al. ................. 704/8 |
| 2011/0093265 | A1* | 4/2011 | Stent et al. ................ 704/243 |
| 2011/0144973 | A1* | 6/2011 | Bocchieri et al. ............. 704/2 |
| 2011/0257974 | A1* | 10/2011 | Kristjansson et al. ..... 704/246 |
| 2011/0295590 | A1* | 12/2011 | Lloyd et al. .................. 704/8 |
| 2011/0301943 | A1* | 12/2011 | Patch ........................... 704/9 |
| 2012/0016670 | A1 | 1/2012 | Khorashadi |
| 2012/0022873 | A1* | 1/2012 | Ballinger et al. ........... 704/275 |
| 2012/0109753 | A1* | 5/2012 | Kennewick et al. ...... 705/14.58 |
| 2012/0172012 | A1* | 7/2012 | Sumcad et al. ............ 455/414.1 |
| 2012/0173244 | A1* | 7/2012 | Kwak et al. ............... 704/275 |

OTHER PUBLICATIONS

Espejo et al. "A System for User Location by Means of RFID Devices for a Dialogue System Designed to Interact in an Ambient Intelligence Environment" 2010.*

Aipperspach et al. "Modeling Human Behavior from Simple Sensors in the Home" 2006.*

Glass et al. "SpeechBuilder: Facilitating Spoken Dialogue System Development" 2001.* van Herden et al. "Language Modeling for What-with-Where on GOOG-411" 2009.*

Bandara, Udana et al., "Design and Implementation of a Bluetooth Signal Strength Based Location Sensing System," Radio and Wireless Conference, IEEE, Sep. 2004, 4 pages.

Liu, X., et al. "Context Dependent Language Model Adaptation," ISCA Interspeech, Sep. 2008, 4 pages.

Saluja, Avneesh et al., "Context-aware Language Modeling for Conversational Speech Translation," Machine Translation Summit XIII, Sep. 2011, 8 pages.

Stent, Amanda et al., "Geo-Centric Language Models for Local Business Voice Search," Human Language Technologies: The 2009 Annual Conference of the North American Chapter of the ACL, Jun. 2009, 8 pages.

Galster, Jason A., "The Effect of Room Volume on Speech Recognition in Enclosures with Similar Mean Reverberation Time", Dissertation submitted to the faculty of the Graduate School of Vanderbilt University, Dec. 2007, 58 pages.

Rudolph, Larry, "Speech II", Persuasive Computing MIT 6.883, Spring 2007, 11 pages.

Suter, Alice H., "Noise and Its Effects", Administrative Conference of the United States, Nov. 1991, 35 pages.

Notification of Transmittal of the International Search Report and the Written Opinion of the International Searching Authority, or the Declaration issued in PCT/US2013/051626 on Sep. 27, 2013, 13 pages.

Chahuara, Pedro et al. "Location of an Inhabitant for Domotic Assistance Through Fusion of Audio and Non-Visual Data," Pervasive Computing Technologies for Healthcare (PervasiveHealth), 2011 5th International Conference on, IEEE, May 23, 2011, pp. 242-245.

* cited by examiner

SPEECH RECOGNITION MODELS BASED ON LOCATION INDICIA

CROSS-REFERENCE TO RELATED APPLICATION

This application claims the benefit of U.S. Provisional Application Ser. No. 61/678,277, filed on Aug. 1, 2012, the entirety of which is hereby incorporated by reference as if fully set forth therein.

TECHNICAL FIELD

This specification generally relates to automated speech recognition.

BACKGROUND

Speech recognition typically relies on speech recognition models of the language spoken. However, for a given language (or dialect of a given language), words may be used differently depending on where the words are uttered. For example, when a person is in their living room, they may frequently use words relating to TV shows and control of media players, whereas when the person is in their kitchen they might use words relating to types of food or cooking. Typical language models used in speech recognition do not typically account for the location-specific context where words are spoken, particularly for variations of word use within a building such as a home.

SUMMARY

In general, an aspect of the subject matter described in this specification may involve an automated speech recognition engine (ASR) that performs speech recognition using models that are based on where, within a building, a speaker makes an utterance. In some implementations, the speech recognition models may be composite models based on two or more context-specific models. The ASR engine may transcribe the utterance into text, for example to be used for a voice query, or convert the utterance into a command that can be executed by a processor.

In some aspects, the subject matter described in this specification may be embodied in methods that include the actions of receiving data corresponding to an utterance, and obtaining location indicia for an area within a building where the utterance was spoken. Further actions include selecting one or more models for speech recognition based on the location indicia, wherein each of the selected one or more models is associated with a weight based on the location indicia. Additionally, the actions include generating a composite model using the selected one or more models and the respective weights of the selected one or more models. And the actions also include generating a transcription of the utterance using the composite model.

Another aspect of the subject matter may be embodied in methods that include the actions of receiving an utterance at a client device and obtaining, at the client device, location indicia for an area within a building where the utterance was spoken. The actions also include communicating, from the client to device to a server, data corresponding to the utterance and the location indicia for the area within the building where the utterance was spoken. And the actions include receiving, at the client device, a transcription of the utterance. In some aspects, the transcription of the utterance was generated using a composite model, and the composite model was generated using one or more models and respective weights of the one or more models that were selected based on the location indicia.

Other versions include corresponding systems, apparatus, and computer programs, configured to perform the actions of the methods, encoded on computer storage devices.

These and other versions may each optionally include one or more of the following features. For instance, some implementations involve receiving data corresponding to the utterance from a client device, and receiving location indicia for the area within the building where the utterance was spoken from the client device. The location indicia may be location data based on short-range wireless radio transmissions received at the client device.

Some implementations involve generating one or more candidate transcriptions of the utterance using a location-independent language model, and then based on comparing the one or more candidate transcriptions with phrases in one or more location-dependent language models, identifying one or more candidate areas within the building.

Certain implementations involve receiving data corresponding to the utterance from a processing system at the building, and receiving location indicia for the area within the building where the utterance was spoken from the processing system at the building. In some aspects, the location indicia is location data obtained from the processing system. The processing system localizes the utterance using a microphone array arranged in the building, where the microphone array is operatively coupled to the processing system.

Additionally, in some implementations the selected models for speech recognition are language models, and the composite models are composite language models. In some implementations, the selected models for speech recognition are acoustic models, and the composite models are composite acoustic models. And in some implementations, the selected models for speech recognition are language models and acoustic models, and the composite speech models are composite language models and composite acoustic models.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

As described below, ASR engines may bias speech recognition models, or select entirely different speech recognition models, based on the area (e.g., room) in a building (e.g., the user's home) where a user makes an utterance. This may involve several features. First, client devices and/or systems of transponders installed in buildings are used to estimate users' locations as they move around the buildings and make utterances. Second, during a training phase, ASR engines perform speech recognition using location-independent speech recognition models, and collect transcriptions of utterances from the various locations throughout the buildings. Third, the transcriptions can be used to generate location-dependent speech recognition models, which can then be used to perform speech recognition. In some aspects, transcriptions from multiple users and/or multiple buildings may be combined to generate aggregate location-dependent speech recognition models. For example, transcriptions of multiple utterances made in or near kitchens located in various buildings can be combined to generate kitchen-specific speech recognition models.

As used in the present disclosure, a location-dependent speech recognition model is a model that is biased toward topics, words, noises, and/or acoustic signatures that are correlated with a given area of a building. An area as used in the present disclosure refers to a functional portion of a building (e.g., a kitchen, dining room, bedroom, living room, bathroom, office). Areas of the same type (e.g., kitchens) may have different sizes and acoustic characteristics (e.g., reverberation) in different buildings, but may share similar noise signatures and vocabularies. For example, a kitchen in a studio apartment may have different acoustic characteristics than a kitchen in a large single family home, but may still have common noises and semantic topics. Thus, a location-dependent model associated with a kitchen area may include words that are related to food and cooking topics, and/or noises that are most often found in kitchens (e.g., microwaves, blenders, dishwashers, etc.). A location-independent speech recognition model is a model that is not biased toward any particular area of a home.

Additionally, a phrase or phrases spoken by a person are referred to in the present disclosure as utterances. In general, utterances may contain one or more words. An utterance can represent any type of voice communication, such as voice-based instructions, commands, or actions (e.g., to operate a home automation system), voice-based search queries, dictation, dialogue systems, or any other input that uses transcribed speech or that invokes a software application using transcribed speech to perform an action.

Figure 1A:
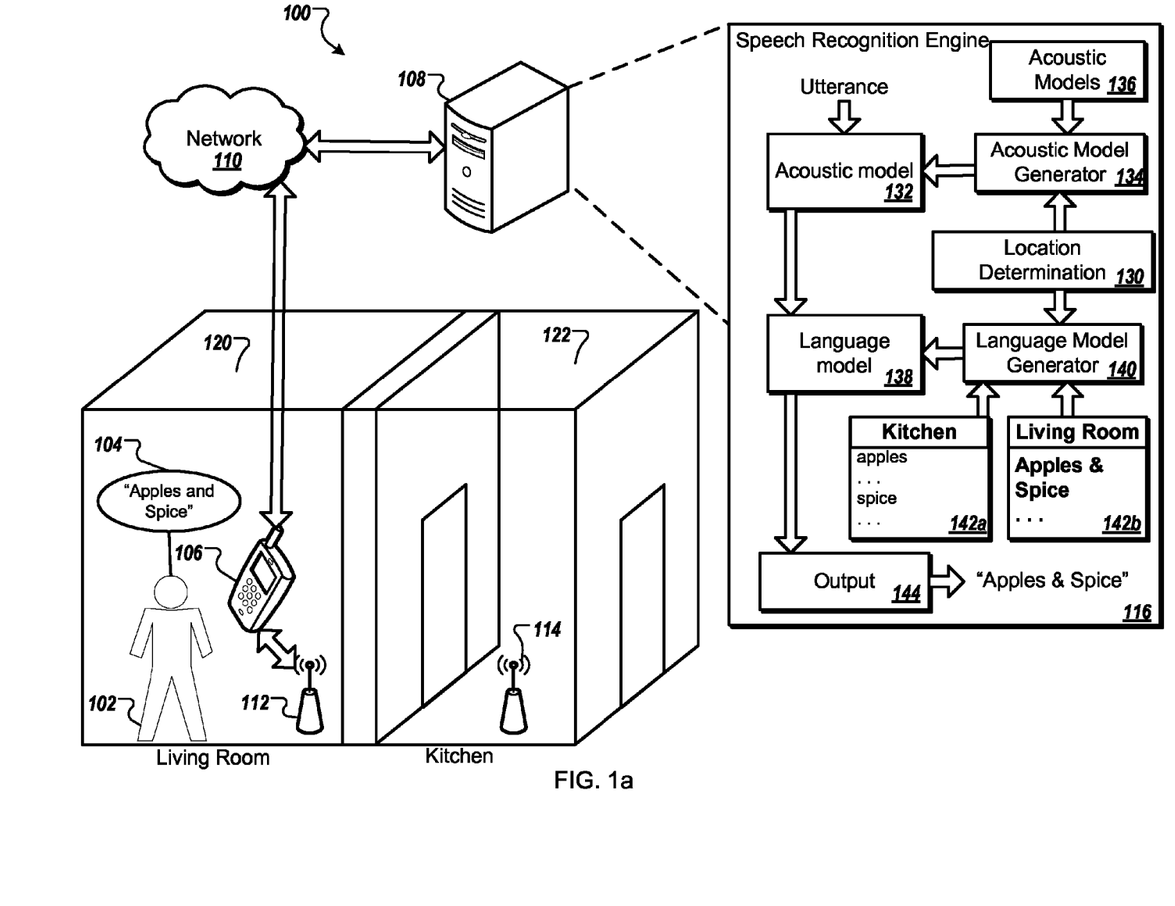
FIGS. 1a and 1b are diagrams of example systems that generate location-dependent speech recognition models, and perform speech recognition using the location-dependent speech recognition models.

FIG. 1a shows an example system 100 that generates location-dependent speech recognition models, and performs speech recognition using the location-dependent speech recognition models. FIG. 1a also illustrates a flow of data within a processing system 102 when speech recognition is performed. Referring to FIG. 1a, a general description of a process for performing speech recognition is first described, and a more detailed description is then provided.

Initially, in FIG. 1a, the user 102 makes an utterance 104 (i.e., "Apples and Spice") while located in the living room 120. For example, the user 102 may have a home automation system that controls an entertainment system in the living room including a music player (e.g., an MP3 player), and the user 102 may intend to play the "Greatest Hits" album of a band called "Apples & Spice." In response to the utterance, the client device 106 encodes the utterance 104 into audio signals and obtains location indicia by detecting a signal from the wireless radio transponder 112. The client device 106 then transmits the audio signals and location indicia (e.g., the identifier of the wireless radio transponder 112) to the processing system 108 via the network 110. The processing system 108 is executing an ASR engine 116 that receives the location indicia and the audio signals.

Assuming that the ASR engine 116 has been trained, the location determination component 130 accesses the location indicia and derives an estimated location of the user 102 when the utterance was spoken. In this example, since the location determination component 130 received the identifier of wireless radio transponder 110 (associated with the living room), the location determination component 130 would output an estimated location corresponding to the living room 120. This estimated location is then output to the acoustic model generator 134 and the language model generator 140. The acoustic model generator 134 selects, from the set of acoustic models 136, a location-dependent acoustic model associated with the living room area. The language model generator 140 selects, from the set of language models 142, a location-dependent language model 142b that is also associated with the living room area.

The ASR engine 116 then uses the selected acoustic model 132 and language model 138 to convert the audio signals corresponding to the utterance 104 into a transcription. In this case, the language model for the living room 142b includes the phrase "Apples & Spice," which the ASR engine 116 identifies as the best match for the utterance 104. For example, the living room language model 142b may be programmed with a user's media library (e.g., movies, music, television shows, video games, etc.). It should be noted that the words "apples" and "spice" are also in the language model for the kitchen 142a, which could cause ambiguity in the absence of additional context information. Advantageously, because the ASR engine 116 bases the selection of the language model on location indicia, which indicate that the user 102 was in the living room 120 rather than the kitchen 122 when the utterance was spoken, the ASR engine 116 may readily resolve the ambiguity.

Finally, the ASR engine 116 may communicate the transcription "Apples & Spice" via the output component 144. For example, the output component 144 may provide an interface to a media player control application executing on the processing system 108, which in turn can cause the media player to queue up "The Greatest Hits of Apples & Spice" album for playback.

In more detail, the user 102 is located in a building (e.g., at the user's home) having multiple areas (e.g., the living room 120 and the kitchen 122). While in the living room 120, the user 102 speaks an utterance 104 into the client device 106 (e.g., "Apples and Spice"). The client device 106 is an electronic device that is under control of a user and that is capable of requesting and receiving resources over the network. A client device (examples of which include the device of FIGS. 1a and 1b) may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a wearable computer, a game console, an interactive or so-called "smart" television, or a combination of any two or more of these data processing devices or other data processing devices.

The user 102 may record the utterance 104 by, for example, pressing a button on the client device 106 to initiate a dialogue before speaking, speaking the utterance, and then releasing the button on the mobile device. In another example, the client device 106 may be activated by the speaker's utterance. In another example, the user may select a user interface control (e.g., a microphone icon) on the client device 106 before speaking the utterance. As yet another example, the microphone may be activated before a user speaks, or may be in an "always on" state, to allow the user to speak without manually activating the microphone. For instance, a client device may use a continuous recording buffer.

The client device 106 then converts the user's utterance 104 into a series of audio signals (e.g., samples or waveforms) that may be, for example, two-second (or more) snippets of relatively high quality audio, such as 16 kHz lossless audio. For example, the client device 106 may create a sound file or a data stream when recording an utterance. Additionally, in response to receiving the utterance 104, the client device 106 initiates a process to obtain location indicia for the area of the building where the utterance was spoken. Location indicia as referred to in the present disclosure are data that indicate a relative likelihood that a signal was obtained from a particular location.

In some implementations, such as the example shown in FIG. 1a, the location indicia may be data describing radio signals transmitted from wireless radio transponders (e.g., wireless radio transponder identifiers and signal strengths) that were received by a client device located in a particular area of a building. For example, wireless radio transponders 130 may be positioned in various areas throughout the building as described below. The wireless radio transponders may be any suitable short-range wireless radio system such as, for example, Bluetooth, Near-Field Communications (NFC), or WiFi.

Wireless radio transponders may be installed in various areas throughout a building, and then associated with the respective areas of the building. For example, the wireless radio transponder 112 may be associated with the living room area 120, and the wireless radio transponder 114 may be associated with the kitchen area 122. The wireless radio transponders can be associated with different areas of the building using any suitable means. For example, the processing system 108 may provide an interface so that users can tag each wireless radio transponder as being in a certain category of room (e.g., kitchen, living room, bedroom, office, dining room, bathroom). In some implementations, the processing system 108 may present a web interface through which users can interact via a Web browser. In other aspects, the processing system 108 may be accessible via a graphical-user interface on the client device 106, such as a mobile application executing on the client device.

Once the client device 106 encodes the utterance 104 into audio signals and obtains the location indicia for the area within the building where the utterance as spoken, the client device transmits the audio signals and location indicia to the processing system 108 via a network 110. In some implementations, the client device 106 may establish a communication session with the processing system 108, and may send the audio signals and location indicia to the processing system 108 during the session. In alternative implementations, the client device 106 obtains and transmits location indicia periodically (e.g., every 30 seconds, every 1 minute, every 5 minutes) regardless of whether an utterance was received. In other implementations, the client device 106 may transmit location indicia when the client device 106 identifies a change, e.g., the client device detects: (i) a new wireless radio transponder identifier, (ii) a change in relative signal strengths of wireless radio transponders, or (iii) that a wireless radio transponder has ceased to be detected. In such implementations, the change in location indicia may indicate that the client device 106 has been relocated to a different area of the building.

The processing system 108 receives audio signals corresponding to utterances and location indicia, which are used to perform speech recognition and/or train location-dependent speech recognition models. The processing system 108 may be one or more computing devices (e.g., servers that include one or more processors and computer readable storage media) that, among other capabilities, convert speech to text using an ASR engine 116. The ASR engine 116 may be a software-implemented input/output system that processes speech into text. The ASR engine 116 may be, for example, software code such as a library, a platform, a software development kit, or an object.

The processing system 108 may be physically located within the same building as the user 102 or may be located remotely. The network 110 can therefore include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a Bluetooth, WiFi, or other such transceiver. In addition, in some implementations, one, several, or all of the functions of the processing system 108 described in the present disclosure may be performed by the client device 106.

The ASR engine 116 may operate in two modes: a training mode, and an operational mode. In training mode, the ASR engine 116: (i) performs speech recognition using location-independent (e.g., unbiased) speech recognition models; and (ii) collects data correlating transcriptions of utterances with locations where the utterances were made to train location-dependent speech recognition models. In operational mode, the ASR engine 116 performs speech recognition using the trained location-dependent speech recognition models. However, in some implementations, the ASR engine 116 continues to train the location-dependent speech recognition models while in operational mode. The ASR engine 116 may determine which mode to operate in based on several inputs. For example, the user 102 may be prompted to select a mode via an interface with the processing system 108. Alternatively, or in addition, the ASR engine 116 may include a predetermined threshold (e.g., a certain number of utterances in a given area or a certain number of identified words in a given area) for switching between modes. In some implementations, external training data may be provided to the ASR engine 116 that may trigger the ASR engine 116 to switch modes. For example, the ASR engine 116 may receive trained location-dependent speech recognition models from an application server that aggregates location-dependent speech recognition models from multiple buildings and users.

The ASR engine 116 includes a variety of components (e.g., software modules or libraries) for performing speech-to-text conversion and training location-dependent speech recognition models. In particular, the ASR engine 116 includes a location determination component 130 that estimates the location of the client device 106 when the utterance 104 was made. The location determination component 130 outputs the estimated location to an acoustic model generator 134 and a language model generator 140. During training mode, the acoustic model generator 134 collects utterances for various categories of rooms to update the set of acoustic models 136. Also, the acoustic model generator 134 may provide a location-independent acoustic model for performing speech recognition. During operational mode, the acoustic model generator 134 generates a location-dependent acoustic model 132 from a set of acoustic models 136. During training mode, the language model generator 140 collects utterances for various categories of rooms to update the set of language models 142. Also, the language model generator 140 may provide a location-independent acoustic model for performing speech recognition. During operational mode, the language model generator 140 generates a location-dependent language model 140 from a set of language models 142. The ASR engine 116 uses the acoustic model 132 and the language model 138 to convert the audio signals from the utterance 104 into a transcription. An output component 144 then outputs the transcription, for example, to the client device 106 or to another component of the processing system 108 (e.g., a home automation system).

In more detail, the location determination component 130 estimates the location of the client device 106 when the utterance was made based on the location indicia (e.g., the signals detected from the wireless radio transponders). For example, the client device 106 may have detected wireless radio transponder 112 and the location indicia could therefore include the corresponding wireless transponder identifier (e.g., "Transponder 1") and, in some implementations, signal strength (e.g., −60 dBm). The location determination component 130 may therefore determine that the client device 106 was in the living room area 120 when the utterance 104 was spoken.

In some implementations, the client device 106 may detect more than one transponder, and the signals from multiple transponders may be weighted to estimate a location. For example, the client device 106 may detect signals from two wireless radio transponders, and determine the signal strengths (e.g., received signal strength indicators (RSSI)) of the signals received. The client device 106 could transmit location indicia describing both signals to the processing system 108, which could use the relative difference between the signal strengths to estimate the location of the client device 106 when the utterance was spoken.

For example, assume the client device 106 detects signals from wireless radio transponder 112 and wireless radio transponder 114. The client device 106 could determine that the signal from wireless radio transponder 112 has an RSSI of −60 dBm, and the signal from wireless radio transponder 114 has an RSSI of −63 dBm. Because the signal strength of wireless radio transponder 112 is 3 dB more than the signal from wireless radio transponder 114, this indicates that the signal from wireless radio transponder 112 is twice as strong as the signal from wireless radio transponder 114, and that the client device 106 was probably closer to transponder 112 than transponder 114. Accordingly, the location determination component 130 could weight the location associated with transponder 112 (e.g., living room area 120) more heavily than that associated with transponder 114 (e.g., kitchen area 122). These weights may correspond to probabilities or likelihoods that the utterance was spoken in the associated area. Thus, using a weighting based on relative signal strength, the location indicia could indicate that the area where the utterance was spoken was the living room with 67% likelihood and the kitchen with 33% likelihood. Table 1 below illustrates location indicia according to this example.

TABLE 1

| Transponder Identifier | Signal Strength at Client Device |
| --- | --- |
| 1 | −60 dBm |
| 2 | −63 dBm |

The output of the location determination component 130 can then be used to generate statistical models for performing speech recognition, or to train speech recognition models. In general, the ASR engine 116 uses statistical models to process speech. The ASR engine 116 may use an acoustic model 132 for processing audio signals to generate sequences of sub-words. Acoustic models may be implemented as, for example, a Hidden Markov Model (HMM) or a Gaussian Mixture Model (GMM). In some aspects, as described below, the ASR engine 116 may use a composite acoustic model generated by an acoustic model generator 134 based on the location indicia. The acoustic model generator 134, described in more detail below, is a component that receives the output of the location determination component 130, generates an acoustic model from a library of acoustic models 136, and outputs an acoustic model for use by the ASR engine 116. In training mode, the acoustic model generator 134 may train location-dependent acoustic models.

The ASR engine 116 uses the sequences of sub-words from the acoustic model 132 as inputs to a language model 138. The language model 138 processes the sequences of sub-words to determine one or more words that best match the sub-word sequences. For example, the ASR engine 116 may compare the sub-word sequences to a vocabulary of words that are included in the language model 138. In some aspects, as described below, the ASR engine 116 may use a composite language model generated by a language model generator 140 based on the location indicia. The language model generator 140, described in more detail below, is a component that receives the output of the location determination component 130, generates a language model from a set of language models 142a, 142b, and outputs a language model 138 for use by the ASR engine 116. In training mode, the language model generator 140 may train location-dependent language models.

Once the ASR engine 116 generates a transcription of the utterance 104, an output component 144 routes the transcription to the appropriate systems. In some implementations, the output component 144 may transmit the transcription back to the client device 106. In other implementations, the output component 144 may send the transcription to another component executing on the processing system 108, such as, for example, a home automation system, a voice-based search service, a dictation application, a word processing application, or any other application that uses transcribed speech or that invokes a software application using transcribed speech to perform an action. In some implementations, the output component 144 may submit a transcription of the speaker's utterance to a search service. A search service identifies resources by crawling and indexing resources provided by the content publishers on Web sites. Data about the resources can be indexed based on the resource to which the data corresponds. Indexed and, optionally, cached copies of the resources that match input keywords can be retrieved and output, e.g., in response to a search query.

Figure 1B:
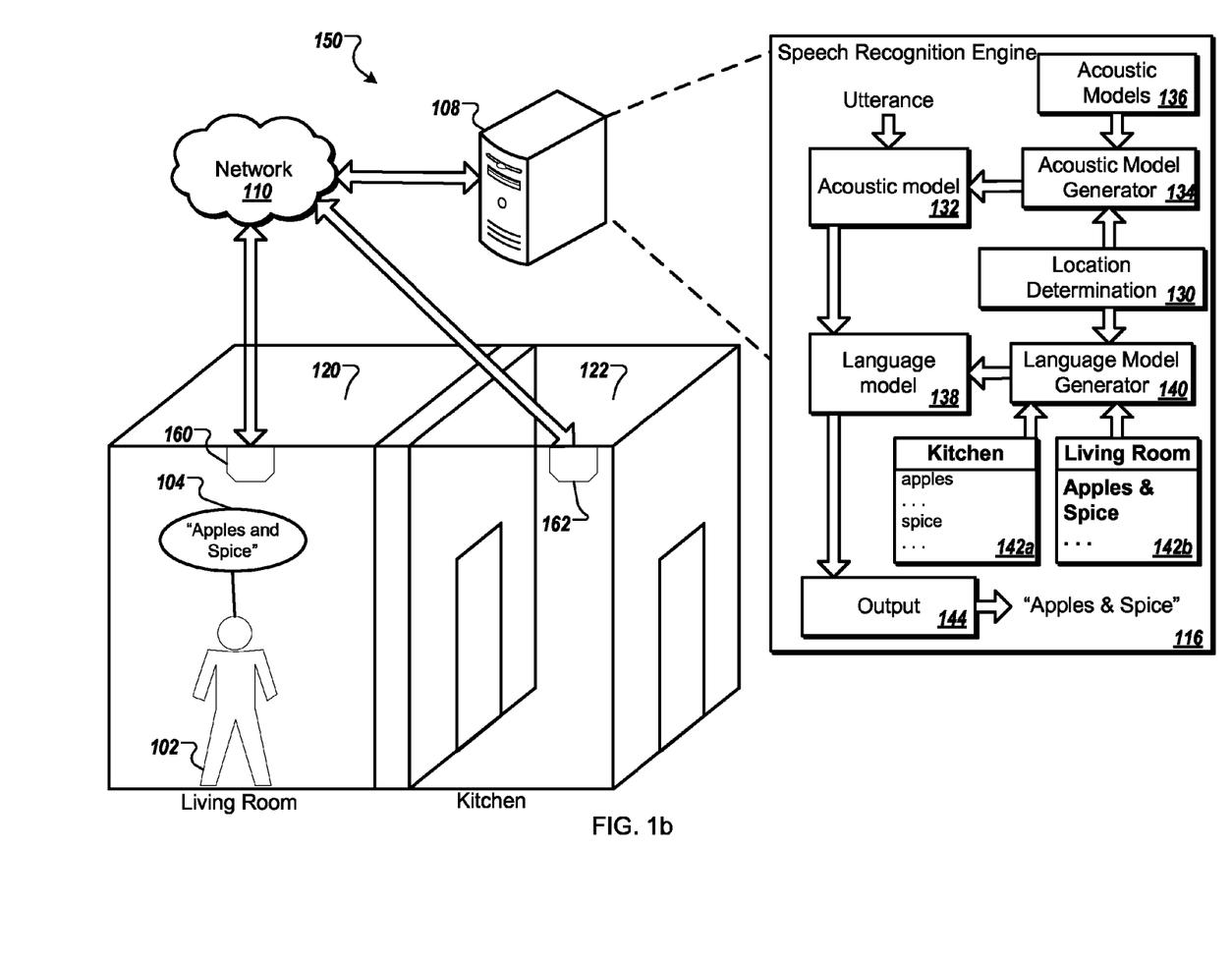

Referring to FIG. 1b, in some implementations, rather than wireless radio transponders, a microphone array may be used to determine the location of the user 102 when the utterance is spoken. As an example, in the system 150 of FIG. 1b, the user 102 makes an utterance 104 (i.e., "Apples and Spice") while located in the living room 120. However, instead of detecting the utterance with a client device, a voice detection device 160 installed in the living room 120 detects the utterance 104. The voice detection device 160 converts the utterance 104 into audio signals. Then, it transmits the audio signals and location indicia (e.g., the identifier of the voice detection device 160 and/or the sound-pressure level of the utterance) to the processing system 108 via the network 110. The processing system 108 is executing an ASR engine 116 that operates as described above to convert the utterance 104 into a voice-command corresponding to "The Greatest Hits of Apples & Spice."

A voice detection device 160, 162 may be any suitable component or set of components suitable to detect an utterance, convert the utterance into audio signals, and communicate the audio signals and location indicia to the processing system 108. For example, a voice detection device may be a microphone that is operatively coupled to the processing system 108. In other implementations, a voice detection device may include a microphone, an analog-to-digital converter, a processor, computer readable storage media, and a network interface capable of communicating with the processing system 108 via the network 110. In some implementations, a voice detection device may include one or more user input/output components (e.g., buttons, an LCD, and/or a presence-sensitive display). The microphones may be any suitable acoustic to electric transducer for converting sound into audio signals, such as unidirectional, bidirectional, or omnidirectional wired or wireless microphones.

Voice detection devices (e.g., a microphone array) may be installed in various areas throughout a building, and then associated with the respective areas of the building. For example, the voice detection device 160 may be associated with the living room area 120, and the voice detection device 162 may be associated with the kitchen area 122. The voice detection devices can be associated with different areas of the building using any suitable means. For example, the processing system 108 may provide an interface so that users can tag each voice detection device as being installed in a certain category of room (e.g., kitchen, living room, bedroom, office, dining room, bathroom). In some implementations, the processing system 108 may present a web interface through which users can interact via a Web browser. In other aspects, the processing system 108 may be accessible via a graphical-user interface on the client device 106, such as a mobile application executing on the client device. In some aspects, one or more of the voice detection devices may include directional microphones aimed at specific areas of the building, in which case utterances coming from the directional microphone may be more highly correlated with a specific area.

The user 102 may initiate the utterance 104 by, for example, pressing a button on the voice detection device 160, 162 to initiate a dialogue before speaking, speaking the utterance, and then releasing the button. In another example, the voice detection device 160 may be activated by the speaker's utterance. As yet another example, the microphone may be activated before a user speaks, or may be in an "always on" state, to allow the user to speak without manually activating the microphone. For instance, a client device may use a continuous recording buffer.

The voice detection device 160, 162 converts the user's utterance 104 into a series of audio signals (e.g., samples or waveforms) that may be, for example, two-second (or more) snippets of relatively high quality audio, such as 16 kHz lossless audio. For example, the voice detection device 160, 162 may create a sound file or a data stream when recording an utterance.

Additionally, in response to receiving the utterance 104, the voice detection device 160, 162 obtains location indicia. The location indicia may include data describing an identifier of the voice detection devices, and/or the sound-pressure level (e.g., dB re 20 µPa RMS) of utterances as received at the voice detection devices. For example, assume the voice detection device 160 detects the utterance 104 with a sound-pressure level of 60 dB. Assume that the voice detection device 162 also detects the utterance 104, but with a sound-pressure level of 57 dB. Because the sound-pressure level at voice detection device 160 is 3 dB more than the sound-pressure level at voice detection device 162, this indicates that the sound-pressure level at voice detection device 160 is twice as strong as the sound-pressure level at voice detection device 162, and that the utterance 104 was probably made closer to voice detection device 160 than voice detection device 162. Accordingly, the location determination component 130 could weight the location associated with voice detection device 160 (e.g., living room area 120) more heavily than that associated with voice detection device 162 (e.g., kitchen area 122). These weights may correspond to probabilities or likelihoods that the utterance was spoken in the associated area. Thus, using a weighting based on relative sound-pressure level, the location indicia could indicate that the area where the utterance was spoken was the living room with 67% likelihood and the kitchen with 33% likelihood. Table 2 below illustrates location indicia according to this example.

TABLE 2

| Voice Detection Device Identifier | Sound Pressure Level |
|---|---|
| 1 | 60 dB |
| 2 | 57 dB |

In some implementations, rather than using identifiers of wireless radio transponders or voice detection devices, the utterances themselves may be used as location indicia. For example, either the client device 106 or the voice detection devices 160, 162, could generate audio signals corresponding to the utterance 104 and transmit them to the processing system 108. The ASR engine 116 could then generate one or more candidate transcriptions of the utterance 104 using location-independent speech recognition models. Then, the ASR engine 116 could compare the candidate transcriptions with phrases in one or more location-dependent language models. The area associated with the best matching location-dependent language model could then be used as the estimated location where the utterance 104 was made. For example, if the transcription using the location-independent speech models was "Apples & Spice," and this phrase is only found in a kitchen language model, then the location could be determined to be the kitchen. If the phrase is found in multiple language models, then the location estimate could weight the associated areas based on the probability of the words occurrence to generate a weighted location estimate (e.g., 33% kitchen, 67% living room), or could choose the area associated with the language model having the highest probability for the word as the estimated location.

Figure 2:
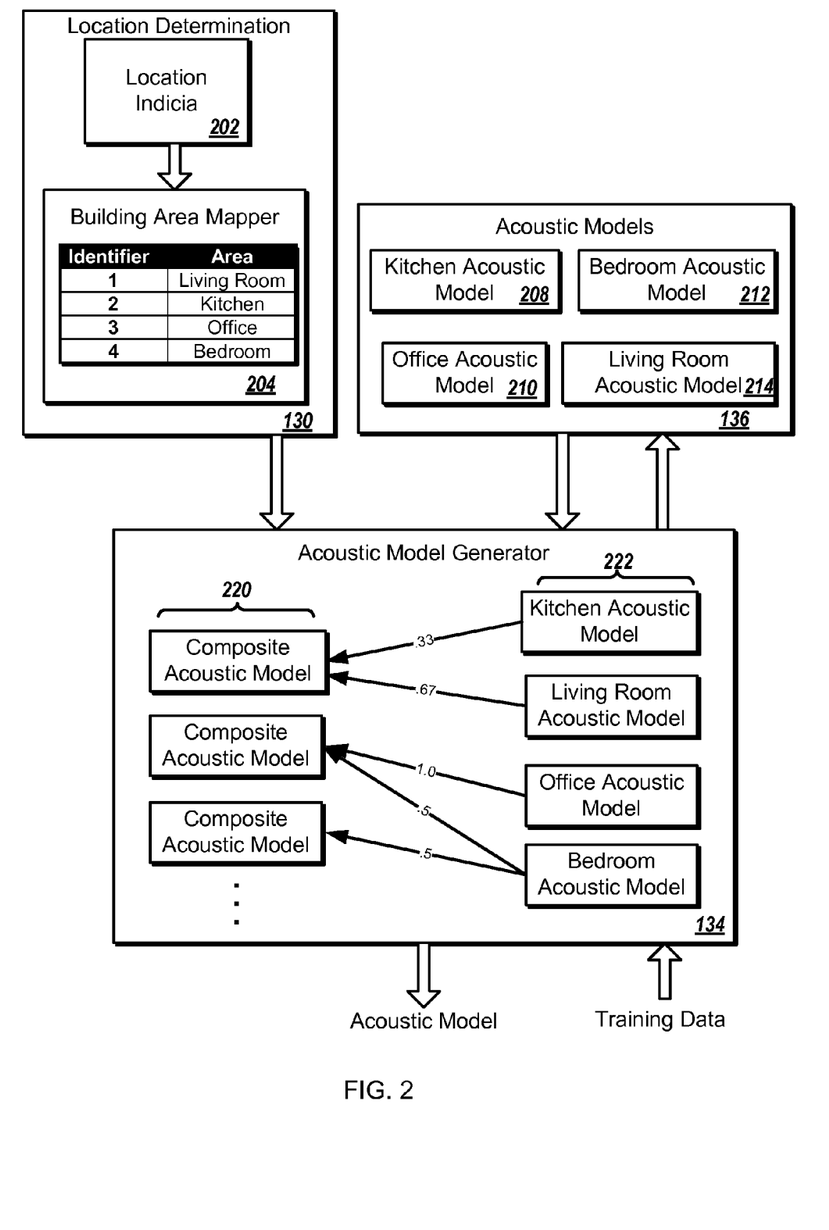
FIG. 2 is a diagram of components of a sample ASR engine that generate and obtain location-dependent acoustic models for use in speech recognition.

FIG. 2 shows components of a sample ASR engine that generate and obtain location-dependent acoustic models for use in speech recognition. In particular, the components include a location determination component 130 that provides an estimated location based on location indicia to an acoustic model generator 134. The acoustic model generator 134 uses the estimated location to select or generate acoustic models from a set of acoustic models 136, or, in training mode, to train acoustic models in the set of acoustic models 136. The set of acoustic models 136 stores location-dependent acoustic models, including a kitchen acoustic model 208, an office acoustic model 210, a bedroom acoustic model 212, and a living room acoustic model 214.

As discussed above, a client device or a voice detection device provides location indicia to the processing system 108, which stores the data in a suitable memory. The location determination component 130 accesses the stored location indicia 202 and generates an estimated location for where in the building the associated utterance was made. In particular, a building area mapper component 204 (e.g., a software library or function) parses the location indicia to generate the estimated location. The estimated location may be in the form of a likelihood or probability that the utterance was made in various categories of rooms. The estimated location may be output in any suitable data structure, such as, for example, an object or set of variables.

For example, assume that the location indicia include only one identifier (e.g., for wireless radio transponders and/or voice detection devices). The building mapper 204 could then generate an estimated location within the building based on the area associated with the identifier. Thus, if the location indicia includes an identifier for a wireless radio transponder 112 associated with the living room area 120, then the estimated location could be 1.0 living room.

Assume that the location indicia include two identifiers. The building area mapper 204 could then generate an estimated location within the building based on interpolating the areas associated with the identifiers. Thus, if the location indicia includes an identifier for a wireless radio transponder 112 associated with the living room area 120, and an identifier for a wireless radio transponder 114 associated with the kitchen area 122, then the estimated location could be 0.50 living room and 0.50 kitchen.

Assume further that the location indicia include two identifiers and the corresponding signal strengths (e.g., the RSSI at the wireless radio transponders or the sound-pressure level at voice detection devices). The building area mapper 204 could then generate an estimated location within the building based on interpolating the areas associated with the identifiers with a weighting based on the relative signal strengths. Thus, if the location indicia includes an identifier for a wireless radio transponder 112 associated with the living room area 120 with an RSSI of −60 dBm, and an identifier for a wireless radio transponder 114 associated with the kitchen area 122 with an RSSI of −63 dBm, then the estimated location could be 0.67 living room and 0.33 kitchen. Note that this example of determining estimated location based on signal strengths is for illustrative purposes, and implementations may involve more fine-tuned and subtle models to improve accuracy of the estimated location. Also, while described for example purposes as receiving location indicia from only two sources, in implementations location indicia could be received from any number of sources.

Upon receiving an estimated location, the acoustic model generator 134 performs operations that depend on whether the ASR engine 116 is operating in training mode or operational mode. In training mode, the acoustic model generator 134 receives training data (e.g., the audio signal for the utterance that is associated with the location indicia) and trains one or more of the acoustic models stored in the set of acoustic models 136. Also, the acoustic model generator provides a location-independent acoustic model for use in performing speech recognition. In operational mode, the acoustic model generator 134 obtains (e.g., selects or generates) a location-dependent acoustic model based on the estimated location for use in performing speech recognition.

The set of acoustic models 136 may be stored in a file structure (e.g., Network File System) or in a database (e.g., MySQL, PostgreSQL, MS SQL Server, MongoDB), or any other suitable data structure that can be accessed by the processing system 108. In some implementations, the processing system 108 may store and access the stored set of acoustic models 136 via web services such as representational state transfer (REST) style services.

The acoustic models in the set 136 may be initially populated with previously trained acoustic models that match various acoustic spaces typically encountered by users. In training mode, the acoustic model generator 134 receives audio signals associated with utterances and makes a determination whether the corresponding acoustic spaces match previously stored acoustic models. Analyzing the audio signals may provide information about acoustic characteristics of the surrounding space. Those characteristics may include the size of the room, noise sources, such as ventilation ducts or exterior windows, and reverberation characteristics.

If the acoustic space does not match a previously stored acoustic model, the acoustic model generator 134 may initialize and adapt a new acoustic model. Based on the size of the surrounding space, the acoustic model generator 134 may also adjust an acoustic model to account for reverberation. This adjustment may be done in a variety of ways including using model adaptation, such as maximum likelihood linear regression to a known target. The target transformation may have been estimated in a previous encounter at that location or may be inferred from the reverberation time associated with the space. Once the location is adequately modeled, the acoustic model generator 134 stores the acoustic model in the set of acoustic models 136.

In operational mode, when the ASR engine 116 performs speech recognition, the acoustic model generator 134 selects location-dependent acoustic models identified by the location estimate. For example, if the location estimate identifies the living room 120 and kitchen 122 as the likely areas where the utterance was made, then the acoustic model generator 134 selects the living room acoustic model 214 and the kitchen acoustic model 208.

The acoustic model generator 134 then generates an acoustic model using the selected location-dependent acoustic models. In particular, composite acoustic models 220 can be linked to one or more base acoustic models 222, which correspond to the acoustic models stored in the set of acoustic models 136. The links between the composite acoustic models 220 and base acoustic models 222 can be weighted. In some examples, the sum of the weights of the links from one composite acoustic model can be 1 or can be normalized to 1.

The acoustic model generator 134 may merge base acoustic models to form composite acoustic model using any suitable technique. For example, assume that each acoustic model includes a set of Gaussian distributions and associated Hidden Markov Models (HMMs). The acoustic model generator 134 may generate a composite acoustic model by mapping the Gaussian distributions and HMMs using weights based on the estimated location. Thus, if the estimated location is 0.67 living room and 0.33 kitchen, then the Gaussian distributions and HMMs could be mapped to generate a composite acoustic model having the Gaussian distributions and HMMs of the living room acoustic model 214 weighted at 67%, and the Gaussian distributions and HMMs of the kitchen acoustic model 208 weighted at 33%.

It will be understood that, although a particular number and configuration of composite acoustic models 220, base acoustic models 222, and links are shown, other numbers and configurations are possible. For example, sufficient composite acoustic models 220 may exist that every weighted combination of base acoustic models 222 has a linked composite acoustic model 220. In some examples, composite acoustic model can be linked to more or fewer base acoustic models 222. In some examples, different link weights between composite acoustic models 220 and base acoustic models 222 may exist, such as positive integers, probabilities, or dimensional distance (e.g., W, X, Y, Z values for four dimensional space).

In some implementations, composite acoustic models 220 can be created on demand, such as when location estimate is received that does not correspond to a previously stored acoustic model. The composite acoustic models 220 can persist by being stored in a memory structure accessible by the acoustic model generator 134. In some implementations, a number of possible composite acoustic models 220 can be pre-generated. This may be used, for example, when pre-processing time is available, and/or when few base acoustic models 222 are expected.

Figure 3A:
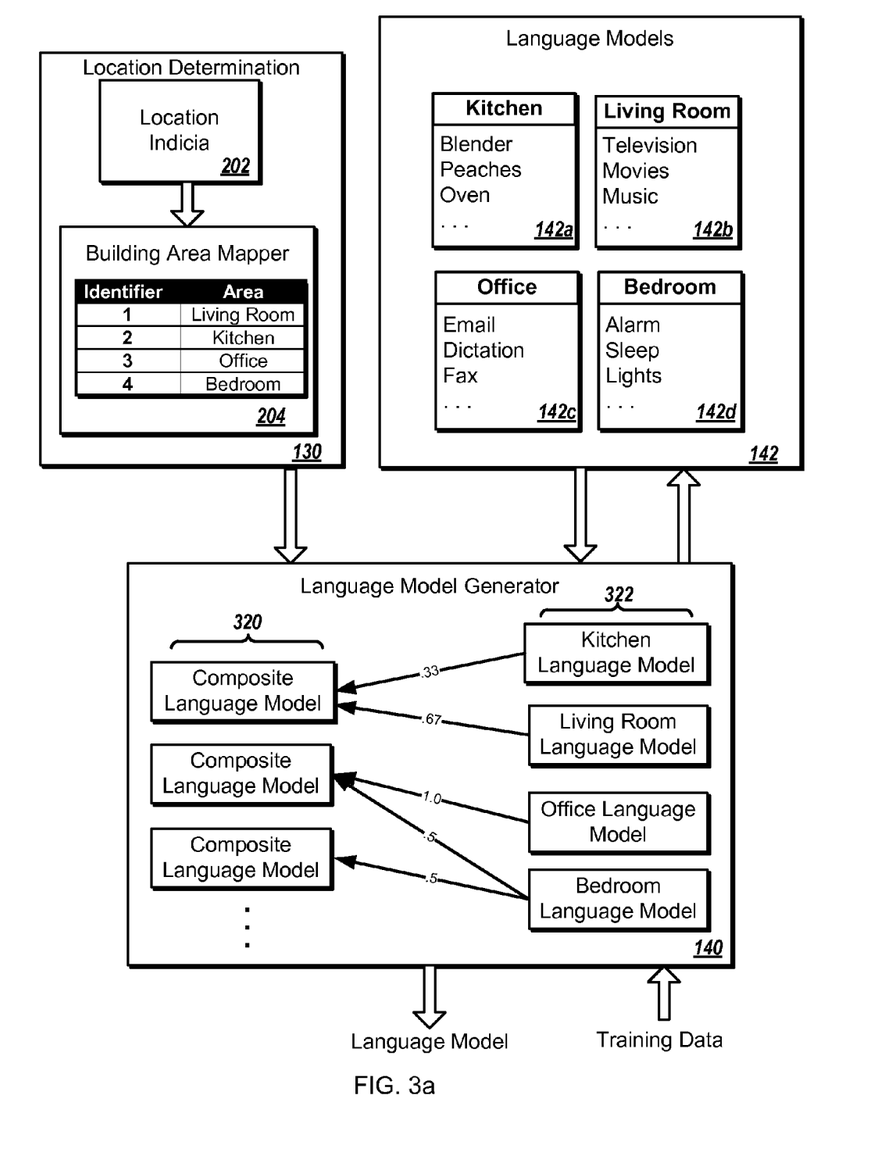
FIGS. 3a and 3b are diagrams of components of sample ASR engines that generate and obtain location-dependent language models for use in speech recognition.
Figure 3B:
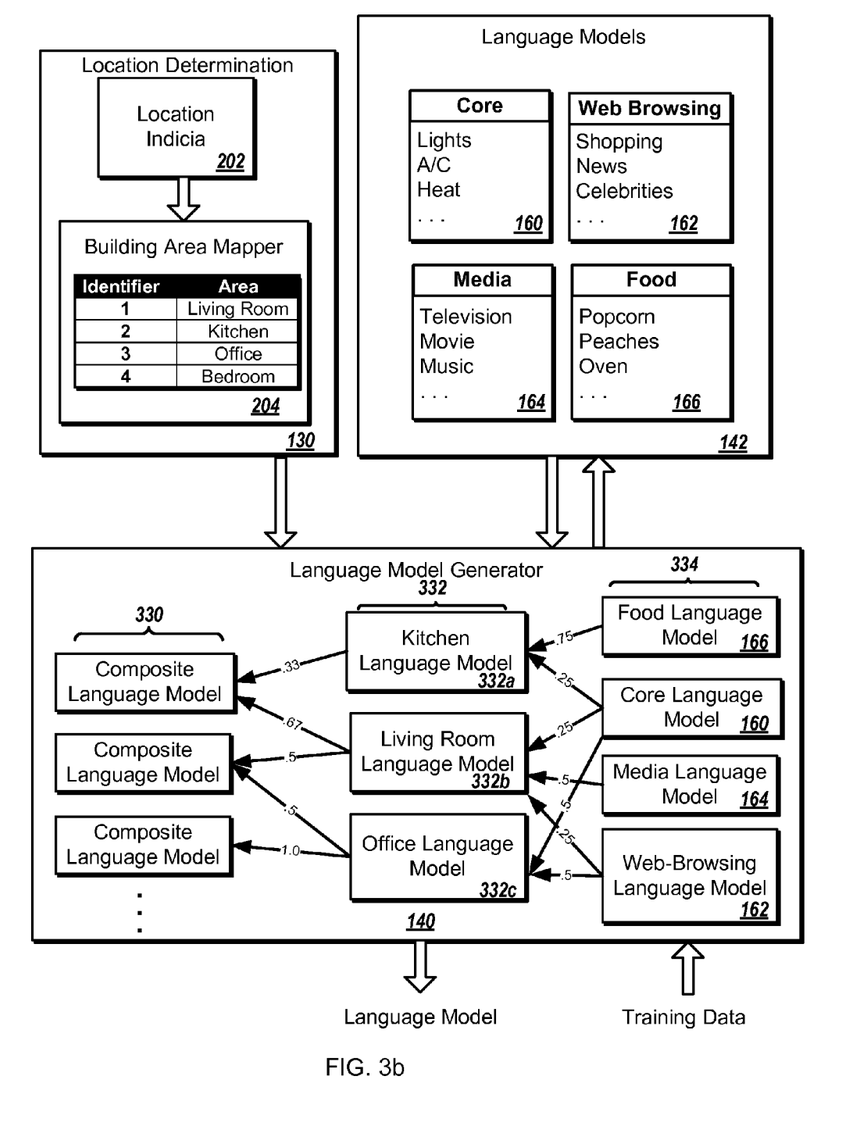

FIGS. 3a and 3b show components of sample ASR engines that generate and obtain location-dependent language models for use in speech recognition. In particular, the components include a location determination component 130 that provides an estimated location based on location indicia to a language model generator 140. The language model generator 140 uses the estimated location to select or generate language models from a set of language models 142, or, in training mode, to train language models in the set of language models 142.

In FIG. 3a, the set of language models 142 stores location-dependent language models, including a kitchen language model 142a, a living room language model 142b, an office language model 142c, and a bedroom language model 142d. As illustrated, the kitchen language model 142a includes food and cooking related words such as "blender," "apples," and "oven"; the living room language model 142b includes media and entertainment related words such as "television," "movies," and "music"; the office language model 142c includes office related words such as "email," "fax," and "dictation"; and the bedroom language model 142d includes sleep related words such as "alarm," "sleep," and "lights."

In FIG. 3b, the set of language models 142 stores a core language model 160, and a variety of topic-specific language models 162, 164, 166 relating to web-browsing, media, and food respectively. Each of the topics may be associated with one or more areas and composite language models can be generated using the core language model and one or more of the topic-specific language models. As illustrated, the core language model 160 includes general words relating to building control such as "lights," "NC," and "heat"; the web-browsing language model 162 includes words such as "shopping," "news," and "celebrities"; the media language model 164 includes words such as "television," "movie," and "music"; and the food language model 166 includes words such as "popcorn," "apples," and "oven."

The location determination component 130 provides an estimated location as discussed above. Upon receiving an estimated location, the language model generator 140 performs operations that depend on whether the ASR engine 116 is operating in training mode or operational mode. In training mode, the language model generator 140 receives training data (e.g., transcriptions made using location-independent language models that are associated with the location indicia) and trains one or more of the language models stored in the set of language models 142. Also, the language model generator provides a location-independent language model for use in performing speech recognition. In operational mode, the language model generator 140 obtains (e.g., selects or generates) a location-dependent language model based on the estimated location for use in performing speech recognition.

The set of language models 142 may be stored in a file structure (e.g., Network File System) or in a database (e.g., MySQL, PostgreSQL, MS SQL Server, MongoDB), or any other suitable data structure that can be accessed by the processing system 108. In some implementations, the processing system 108 may store and access the stored set of language models 142 via web services such as representational state transfer (REST) style services.

The language models in the set 142 may be populated with previously trained language models that include commonly used words corresponding to categories of rooms or topics. For example, a third-party web service may combine transcriptions from multiple users and/or multiple buildings to generate aggregated location-dependent language models for potential categories of rooms (e.g., kitchen, living room, office, bedroom). In addition, language models for some categories of rooms may be populated by referring to content or products owned by a user. For example, the ASR engine 116 could access titles from a user's media library (e.g., movies, music, television shows, video games, etc.) to populate language models for categories of rooms that might have a media player (e.g., a living room or bedroom). Similar techniques could be used to populate the topic-specific language models. In training mode, the language model generator 140 receives transcriptions associated with estimated locations and trains the corresponding location-dependent language models and/or topic-specific language models using the words from the transcription.

Referring to the sample system of FIG. 3a, in operational mode, the language model generator 140 selects location-dependent language models identified by the location estimate. For example, if the location estimate identifies the living room 120 and kitchen 122 as the likely areas where the utterance was made, then the language model generator 140 selects the living room language model 142a and the kitchen language model 142b.

The language model generator 140 then generates a language model using the selected location-dependent language models. In particular, composite language models 320 can be linked to one or more base language models 322, which correspond to the language models stored in the set of language models 140. The links between the composite language models 320 and base language models 322 can be weighted. In some examples, the sum of the weights of the links from one composite language model can be 1 or can be normalized to 1.

Although a particular number and configuration of composite language models 320, base language models 322, and links are shown, other numbers and configurations are possible. For example, sufficient composite language models 320 may exist that every weighted combination of base language models 322 has a linked composite language model 320. In some examples, composite language model can be linked to more or fewer base language models 322. In some examples, different link weights between composite language models 320 and base language models 322 may exist, such as positive integers, probabilities, or dimensional distance (e.g., W, X, Y, Z values for four dimensional space).

In some implementations, composite language models 320 can be created on demand, such as when location estimate is received that does not correspond to a previously stored language model. The composite language models 320 can persist by being stored in a memory structure accessible by the language model generator 140. In some implementations, a number of possible composite language models 320 can be pre-generated. This may be used, for example, when pre-processing time is available, and/or when few base language models 322 are expected.

Referring to the sample system of FIG. 3b, in operational mode, the language model generator 140 generates a composite location-dependent language model in two steps: 1) generating area-specific language models from topic-specific language models; and 2) generating a composite location-dependent language model from the area-specific language models.

In the first step, the language model generator 140 creates area-specific language models (e.g., kitchen language model, living room language model, and office language model) by combining topic-specific language models using various weights. Each area-specific language model may include the core language model to varying degrees. In some implementations, the topic specific language models 334 can be linked to one or more area-specific language models 332. The links between the composite language models 330 and area-specific language models 332 can be weighted. In some examples, the sum of the weights of the links from one composite language model can be 1 or can be normalized to 1.

The weights may be predetermined based on empirical analysis, and/or they may be trained in the training mode. The weights also may be periodically updated based on a user's habits. For example, if the user primarily performs web-browsing in the living room, then the weight for the web-browsing topics could increase over time based on this usage. As another example, during training, the language model generator 140 may determine whether a backend semantic service responds to a given utterance. A backend semantic service may be a function of a home automation system, a search service, an application, or any other service that may accept voice-commands. For example, if a television-related backend semantic service responds to a given utterance, then that utterance can be identified as corresponding to a media-topic related language model. If the media-topic related language models are associated with the living room, then this would indicate that the utterance was likely made in the living room. The language model generator 140 can persist these weights in any suitable memory structure such as a database or file system.

As illustrated, a sample kitchen language model 332a includes weights of 75% of the food language model 166 and 25% of the core language model 160; a sample living language model 332b includes weights of 50% of the media language model 164, 25% of the web-browsing language model 162, and 25% of the core language model 160; and a sample office language model 332c includes weights of 50% of the web-browsing language model 162 and 50% of the core language model 160.

In the second step, the language model generator 140 generates a location-dependent composite language model using the selected area-specific language models identified in the location estimate from the location determination component 130. In particular, composite language models 330 can be linked to one or more area-specific language models 332, which were generated in the first step. The links between the composite language models 330 and area-specific language models 332 can be weighted. In some examples, the sum of the weights of the links from one composite language model can be 1 or can be normalized to 1.

Although a particular number and configuration of composite language models 330, area-specific language models 332, topic-specific language models 334, and links are shown, other numbers and configurations are possible. For example, sufficient composite language models 330 may exist that every weighted combination of area-specific language models 332 has a linked composite language model 330. In some examples, composite language model can be linked to more or fewer area-specific language models 332. In some examples, different link weights amongst composite language models 330, area-specific language models 332, and topic-specific language models 334 may exist, such as positive integers, probabilities, or dimensional distance (e.g., W, X, Y, Z values for four dimensional space).

In some implementations, composite language models 330 can be created on demand, such as when location estimate is received that does not correspond to a previously stored language model. The composite language models 330 can persist by being stored in a memory structure accessible by the language model generator 140. In some implementations, a number of possible composite language models 330 can be pre-generated. This may be used, for example, when pre-processing time is available, and/or when few area-specific language models 332 are expected.

The language model generator 140 may merge language models using any suitable technique. For example, assume each language model includes words and associated counts (e.g. frequency) for each word. The language model generator 140 could use a count merging strategy such as maximum a posteriori (MAP) adaptation. Such a count merging strategy could generate a probability of the word, p(w|h) as shown in Equation (1), below:

$$p(w \mid h) = \frac{xc_1(hw) + (1-x)c_2(hw)}{xc_1(w) + (1-x)c_2(w)} \quad (1)$$

In Equation (1), hw is an n-gram ending in word w with a context h, $c_1(hw)$ and $c_2(hw)$ are the counts of hw in a first and second language model respectively, and x is a constant that controls the contribution of each language models' corpus to the combined language model.

Alternatively, the language model generator 140 may generate composite language models using a language model union strategy. This could generate a probability of a word, p(w) as shown in Equation (2), below:

$$p(w) = \max(xp_1(w), (1-x)p_2(w)) \quad (2)$$

In Equation (2), $p_1(w)$ and $p_2(w)$ are the probabilities of w in a first and second language model respectively, and x is a constant that controls the contribution of each language models' corpus to the combined language model.

Figure 4:
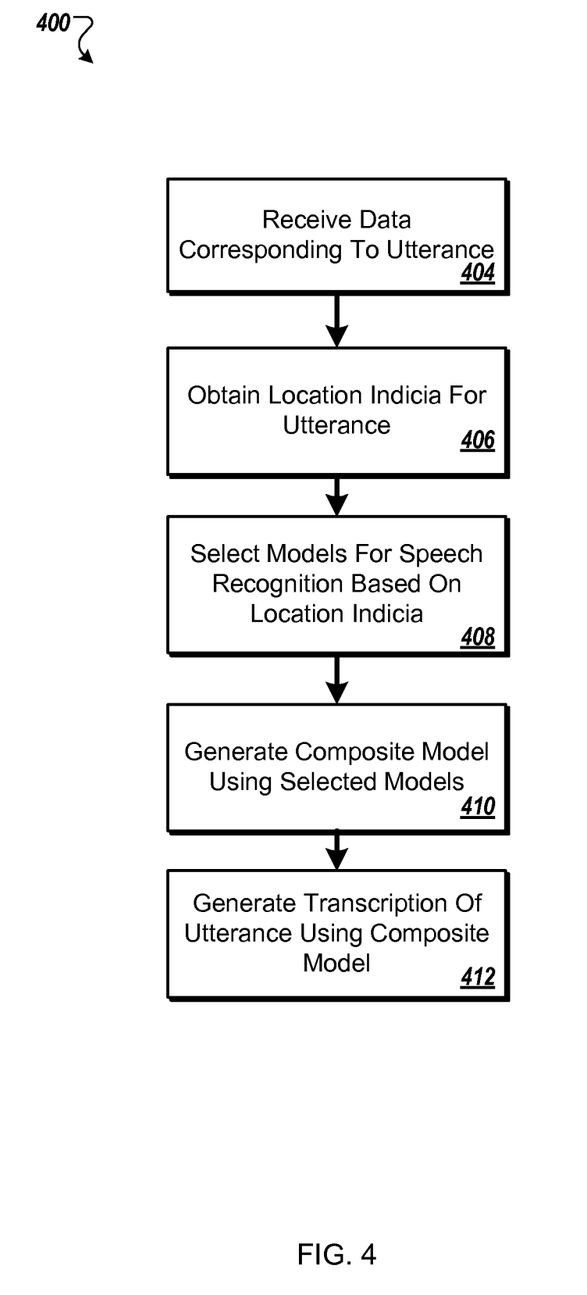
FIG. 4 is a flowchart of an example process for performing speech recognition using speech recognition models based on location indicia.

FIG. 4 shows an example process 400 for performing speech recognition using speech recognition models based on location indicia. In brief, the process 400 includes receiving data corresponding to an utterance (404), obtaining location indicia for an area within a building where the utterance was spoken (406), selecting one or more models for speech recognition based on the location indicia, wherein each of the selected one or more models is associated with a weight based on the location indicia (408), generating a composite model using the selected one or more models and the respective weights of the selected one or more models (410), and generating a transcription of the utterance using the composite model (412).

In more detail, the process 400 begins in step 404 when the ASR engine 116 receives data corresponding to an utterance from a client device 160 or a voice detection device 160, 162. For example, the audio signals may be, for example, snippets of relatively high quality audio, such as 16 kHz lossless audio.

As described above, in step 406, the ASR engine 116 then obtains location indicia for an area in the building where the utterance was spoken. For example, the location indicia may be identifiers of wireless radio transponders or voice detection devices, and may also include signal strengths (e.g., RSSI and/or sound-pressure level). In some implementations, the location indicia may be location data based on short-range wireless radio transmissions received at a client device. Alternatively, the location indicia may be generated from the utterance. In particular, the ASR engine 116 may generate one or more candidate transcriptions of the utterance using a location-independent language model. Then the ASR engine 116 may, based on comparing the one or more candidate transcriptions with phrases in one or more location-dependent language models, identify one or more candidate areas within the building. In such implementations, the ASR engine 116 receives data corresponding to the utterance from a processing system at the building. In yet other implementations, the location indicia may be location data obtained from the processing system. In such implementations, the processing system may localize the utterance using a microphone array (e.g., voice detection devices) arranged in the building that is operatively coupled to the processing system.

Next, in step 408, the ASR engine 116 selects one or more speech models (e.g., acoustic models and/or language models) for speech based on the location indicia. Each of the selected speech models may be associated with a weight based on the location indicia. For example, if the ASR engine 116 received identifiers corresponding to the kitchen and the living room areas at 33% and 67% respectively, then the selected speech models for the kitchen and living room would be selected and weighted accordingly.

The ASR engine 116 then generates a composite speech model using the selected one or more speech models and the respective weights in step 410. The ASR engine 166 may combine the speech models (e.g., acoustic models and/or language models) as described in described in more detail above. Finally, in step 412, the ASR engine 116 generates a transcription of the utterance using the composite speech model.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A home automation system is a software, firmware, and/or hardware system that integrates electrical devices in a house with each other. Home automation may include centralized control of lighting, HVAC (heating, ventilation and air conditioning), appliances, and other systems. Home automation systems may also control of domestic activities, such as home entertainment systems, houseplant and yard watering, pet feeding, and/or domestic robots. Devices in the home may be connected through a computer network to allow control by a processing system, and may allow remote access from the internet.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
receiving, at a processing system, data corresponding to an utterance;
obtaining, at the processing system, location indicia for an area within a building where the utterance was spoken;
determining, at the processing system, a set of likelihoods based on the location indicia, each likelihood in the set corresponding to a likelihood that the utterance was spoken in a particular area of the building from a plurality of candidate areas of the building;
selecting, at the processing system, one or more candidate areas of the building from the plurality of candidate areas of the building based on the set of likelihoods;
accessing, for each selected candidate area of the building, a model for speech recognition associated with the respective candidate area of the building;
generating, at the processing system, a composite model using the accessed models for speech recognition and the likelihoods associated with the corresponding candidate areas of the building; and
generating, at the processing system, a transcription of the utterance using the composite model.

2. The method of claim 1,
wherein receiving data corresponding to the utterance comprises receiving data corresponding to the utterance from a client device, and
wherein obtaining location indicia for an area within a building where the utterance was spoken comprises receiving location indicia for the area within the building where the utterance was spoken from the client device.

3. The method of claim 2, wherein the location indicia comprises location data based on short-range wireless radio transmissions received at the client device.

4. The method of claim 1, wherein obtaining the location indicia comprises:
generating one or more candidate transcriptions of the utterance using a location-independent language model; and
based on comparing the one or more candidate transcriptions with phrases in one or more location-dependent language models, identifying one or more candidate areas within the building.

5. The method of claim 1,
wherein receiving data corresponding to the utterance comprises receiving data corresponding to the utterance from a processing system at the building, and wherein obtaining location indicia for an area within a building where the utterance was spoken comprises receiving location indicia for the area within the building where the utterance was spoken from the processing system at the building.

6. The method of claim 5, wherein the location indicia comprises location data obtained from the processing system, wherein the processing system localizes the utterance using a microphone array arranged in the building, and wherein the microphone array is operatively coupled to the processing system.

7. The method of claim 1,
wherein each model for speech recognition associated with the candidate areas of the building comprises a language model; and
wherein the composite model comprises a composite language model.

8. The method of claim 1,
wherein each model for speech recognition associated with the candidate areas of the building comprises an acoustic model; and
wherein the composite model comprises a composite acoustic model.

9. A system comprising:
one or more computers and one or more storage devices storing instructions that are operable, when executed by the one or more computers, to cause the one or more computers to perform operations comprising:
receiving data corresponding to an utterance;
obtaining location indicia for an area within a building where the utterance was spoken;
determining a set of likelihoods based on the location indicia, each likelihood in the set corresponding to a likelihood that the utterance was spoken in a particular area of the building from a plurality of candidate areas of the building;
selecting one or more candidate areas of the building from the plurality of candidate areas of the building based on the set of likelihoods;
accessing, for each selected candidate area of the building, a model for speech recognition associated with the respective candidate area of the building;
generating a composite model using the accessed models for speech recognition and the likelihoods associated with the corresponding candidate areas of the building; and
generating a transcription of the utterance using the composite model.

10. The system of claim 9,
wherein receiving data corresponding to the utterance comprises receiving data corresponding to the utterance from a client device, and
wherein obtaining location indicia for an area within a building where the utterance was spoken comprises receiving location indicia for the area within the building where the utterance was spoken from the client device.

11. The system of claim 10, wherein the location indicia comprises location data based on short-range wireless radio transmissions received at the client device.

12. The system of claim 9, wherein obtaining the location indicia comprises:
generating one or more candidate transcriptions of the utterance using a location-independent language model; and
based on comparing the one or more candidate transcriptions with phrases in one or more location-dependent language models, identifying one or more candidate areas within the building.

13. The system of claim 9,
wherein receiving data corresponding to the utterance comprises receiving data corresponding to the utterance from a processing system at the building, and
wherein obtaining location indicia for an area within a building where the utterance was spoken comprises receiving location indicia for the area within the building where the utterance was spoken from the processing system at the building.

14. The system of claim 13, wherein the location indicia comprises location data obtained from the processing system, wherein the processing system localizes the utterance using a microphone array arranged in the building, and wherein the microphone array is operatively coupled to the processing system.

15. The system of claim 9,
wherein each model for speech recognition associated with the candidate areas of the building comprises a language model; and
wherein the composite model comprises a composite language model.

16. The system of claim 9,
wherein each model for speech recognition associated with the candidate areas of the building comprises an acoustic model; and
wherein the composite model comprises a composite acoustic model.

17. A non-transitory computer-readable medium storing software comprising instructions executable by one or more computers which, upon such execution, cause the one or more computers to perform operations comprising:
receiving data corresponding to an utterance;
obtaining location indicia for an area within a building where the utterance was spoken;
determining a set of likelihoods based on the location indicia, each likelihood in the set corresponding to a likelihood that the utterance was spoken in a particular area of the building from a plurality of candidate areas of the building;
selecting one or more candidate areas of the building from the plurality of candidate areas of the building based on the set of likelihoods;
accessing, for each selected candidate area of the building, a model for speech recognition associated with the respective candidate area of the building;
generating a composite model using the accessed models for speech recognition and the likelihoods associated with the corresponding candidate areas of the building; and
generating a transcription of the utterance using the composite model.

18. The computer-readable medium of claim 17,
wherein receiving data corresponding to the utterance comprises receiving data corresponding to the utterance from a client device, and
wherein obtaining location indicia for an area within a building where the utterance was spoken comprises receiving location indicia for the area within the building where the utterance was spoken from the client device.

19. The computer-readable medium of claim 18, wherein the location indicia comprises location data based on short-range wireless radio transmissions received at the client device.

20. The computer-readable medium of claim 17, wherein obtaining the location indicia comprises:
- generating one or more candidate transcriptions of the utterance using a location-independent language model; and
- based on comparing the one or more candidate transcriptions with phrases in one or more location-dependent language models, identifying one or more candidate areas within the building.

21. The computer-readable medium of claim 17,
- wherein receiving data corresponding to the utterance comprises receiving data corresponding to the utterance from a processing system at the building, and
- wherein obtaining location indicia for an area within a building where the utterance was spoken comprises receiving location indicia for the area within the building where the utterance was spoken from the processing system at the building.

22. The computer-readable medium of claim 21, wherein the location indicia comprises location data obtained from the processing system, wherein the processing system localizes the utterance using a microphone array arranged in the building, and wherein the microphone array is operatively coupled to the processing system.

23. The computer-readable medium of claim 17,
- wherein each model for speech recognition associated with the candidate areas of the building comprises a language model; and
- wherein the composite model comprises a composite language model.

24. The computer-readable medium of claim 17,
- wherein each model for speech recognition associated with the candidate areas of the building comprises an acoustic model; and
- wherein the composite model comprises a composite acoustic model.

25. A client device comprising:
- one or more processors and one or more storage devices storing instructions that are operable, when executed by the one or more processors, to cause the one or more processors to perform operations comprising:
- receiving an utterance at a client device;
- obtaining, at the client device, location indicia for an area within a building where the utterance was spoken;
- communicating, from the client device to a server, data corresponding to the utterance and the location indicia for the area within the building where the utterance was spoken; and
- receiving, at the client device, a transcription of the utterance, wherein the transcription of the utterance was generated using a composite model, and wherein the composite model was generated using one or more selected models associated with one or more predetermined areas of the building, each of the one or more selected models being selected based on a likelihood that the utterance was spoken in the corresponding predetermined area of the building.

26. The client device of claim 25, wherein the location indicia comprises location data based on short-range wireless radio transmissions received at the client device.

27. The client device of claim 25, wherein the composite model comprises a composite acoustic model, and wherein the one or more models and respective weights of the one or more models comprises one or more acoustic models and respective weights of the one or more acoustic models.

28. The client device of claim 25, wherein the composite model comprises a composite language model, and wherein the one or more models and respective weights of the one or more models comprises one or more language models and respective weights of the one or more language models.

\* \* \* \* \*